US010340984B2

United States Patent
Tomasi et al.

(10) Patent No.: US 10,340,984 B2
(45) Date of Patent: Jul. 2, 2019

(54) SIMULTANEOUS INFORMATION AND POWER TRANSFER

(71) Applicant: Huawei Technologies Co., Ltd., Shenzhen (CN)

(72) Inventors: Beatrice Tomasi, Boulogne Billancourt (FR); Marco Maso, Boulogne Billancourt (FR); Marios Kountouris, Boulogne Billancourt (FR); Moez Draief, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/917,174

(22) Filed: Mar. 9, 2018

(65) Prior Publication Data

US 2018/0198488 A1    Jul. 12, 2018

Related U.S. Application Data (63) Continuation of application No. PCT/EP2015/070852, filed on Sep. 11, 2015.

(51) Int. Cl.
| | |
|---|---|
| *H04B 5/00* | (2006.01) |
| *H04W 72/04* | (2009.01) |
| *H04W 72/08* | (2009.01) |
| *H02J 50/40* | (2016.01) |
| *H02J 50/80* | (2016.01) |
| *H02J 50/23* | (2016.01) |

(52) U.S. Cl.
CPC ........... *H04B 5/0031* (2013.01); *H02J 50/40* (2016.02); *H02J 50/80* (2016.02); *H04B 5/0037* (2013.01); *H04B 5/0056* (2013.01); *H04W 72/048* (2013.01); *H04W 72/085* (2013.01); *H02J 50/23* (2016.02)

(58) Field of Classification Search
CPC ............................ H04B 5/0031; H04B 5/0037
See application file for complete search history.

(56) References Cited

U.S. PATENT DOCUMENTS

| | | | |
|---|---|---|---|
| 2010/0044123 A1* | 2/2010 | Perlman | B60L 11/1816 180/2.1 |
| 2012/0202435 A1 | 8/2012 | Kim et al. | |
| 2013/0301560 A1* | 11/2013 | Geirhofer | H04B 7/0621 370/329 |

FOREIGN PATENT DOCUMENTS

EP    2518863 A1    10/2012

OTHER PUBLICATIONS

Shi et al., "Joint Transmit Beamforming and Receive Power Splitting for MISO SWIPT Systems", IEEE Transactions on Wireless Communications vol. 13, No. 6, XP011551752, Institute of Electrical and Electronics Engineers, New York, New York (Jun. 2014).

(Continued)

*Primary Examiner* — Tuan H Nguyen
(74) *Attorney, Agent, or Firm* — Leydig, Voit & Mayer, Ltd.

(57) ABSTRACT

The present invention relates to a system for controlling energy transmission from a transmitter to at least one device, in particular network device, the system comprising: a controller which is configured to receive feedback information on energy transmission and/or on data transmission from the device and/or another device; and a mapper which is configured to allocate the device to an energy transfer resource based on the feedback information.

10 Claims, 6 Drawing Sheets

(56) References Cited

OTHER PUBLICATIONS

Lu et al.,"Wireless Networks With RF Energy Harvesting: A Contemporary Survey", IEEE Communications Surveys & Tutorials, vol. 17, No. 2, XP011582191, Institute of Electrical and Electronics Engineers, New York, New York (2015).

"3rd Generation Partnership Project; Technical Specification Group Radio Access Network; Study on elevation beamforming/Full-Dimension (FD) Multiple Input Multiple Output (MIMO) for LTE (Release 13)," 3GPP TR 36.897 v13.0.0, XP050965818, 3rd Generation Partnership Project, Valbonne, France (Jun. 2015).

Zhou et al., "Wireless Information and Power Transfer: Architecture Design and Rate-Energy Tradeoff," IEEE Global Communications Conference (Globecom), Institute of Electrical and Electronics Engineers, New York, New York (2013).

Ju et al., "A Novel Mode Switching Scheme Utilizing Random Beamforming for Opportunistic Energy Harvesting," IEEE Wireless Communications and Networking Conference (WCNC), Institute of Electrical and Electronics Engineers, New York, New York (2014).

Zhang et al., "MIMO Broadcasting for Simultaneous Wireless Information and Power Transfer," IEEE Transactions on Wireless Communications, vol. 12, No. 5, Institute of Electrical and Electronics Engineers, New York, New York (May 2013).

Xing et al., "MIMO Beamforming Designs With Partial CSI Under Energy Harvesting Constraints," IEEE Signal Processing Letters, vol. 20, No. 4, Institute of Electrical and Electronics Engineers, New York, New York (Apr. 2013).

Ju et al., "Throughput maximization in wireless powered communication networks," IEEE Transactions on Wireless Communications, vol. 13, No. 1, pp. 418-428, Institute of Electrical and Electronics Engineers, New York, New York (2014).

Xu et al., "Multiuser MISO Beamforming for Simultaneous Wireless Information and Power Transfer," IEEE International Conference on Acoustics, Speech, and Signal Processing (ICASSP), Institute of Electrical and Electronics Engineers, New York, New York, (2014).

Son et al., "Joint Beamforming Design for Multi-user Wireless Information and Power Transfer," Institute of Electrical and Electronics Engineers, New York, New York, (Jul. 2014).

Gupta et al., "Digital Beamforming for Simultaneous Power and Information Transmission in Wireless Systems," Proc. of Int. Conf. on Advances in Signal Processing and Communication, ACEEE (2013).

* cited by examiner

SIMULTANEOUS INFORMATION AND POWER TRANSFER

CROSS-REFERENCE TO RELATED APPLICATIONS

This application is a continuation of International Application No. PCT/EP2015/070852, filed on Sep. 11, 2015, the disclosure of which is hereby incorporated by reference in its entirety.

TECHNICAL FIELD

The present patent application relates to the field of information provision in adaptive PHY-MAC, abbreviation for physical layer—media access control layer communication, for simultaneous information and power transfer.

In particular, the present application relates to a system and a method for controlling energy transmission from a transmitter to at least one device, in particular network device.

BACKGROUND

The large amount of wireless communication data occurring nowadays heavily affects the battery lifetime of devices, in particular of wireless network devices. One solution to circumvent more frequent out of service events due to battery depletion is the energy transfer through radio frequency, RF, waves.

The current implementation of RF energy or power transfer allows either decoding information or harvesting energy in an exclusive manner Examples are power or time splitting, where in the former the incoming signal is split in two lower power portions, one for data and another for energy, whereas in the latter the decoding and harvesting alternates over time.

One has recently focused on optimal allocation of, e.g. time, power, and beams, in order to quantify, in ideal conditions, the amount of power that can be transferred while guaranteeing Quality of Service, QoS, for data transmissions and vice versa.

One assumes perfect side information available at the device or at the energy provider, thus neglecting this signaling aspect that is required to make simultaneous wireless information and power transfer, abbreviated SWIPT, feasible.

SUMMARY AND DESCRIPTION

It is the object of the present invention to provide an improved technique for realizing simultaneous information and power transfer to devices, in particular to network devices.

This object is achieved by the features of the independent claims. Further implementation forms are apparent from the dependent claims, the description and the figures.

According to a first aspect, a system for controlling energy transmission from a transmitter to at least one device, in particular network device, is provided. The system comprises a controller which is configured to receive feedback information on energy transmission and/or on data transmission from the device and/or another device. The system further comprises a mapper which is configured to allocate the device to an energy transfer resource based on the feedback information.

In other words, the present invention advantageously details the information provision process and the decision process to be implemented when SWIPT-enabled transceivers are designed. In particular, the present invention advantageously does not operate on a snapshot of the network to solve a specific problem, but rather controls the amount of signaling in the network on-the-fly, as well as the operations that need to be performed to serve the users.

In other words, the present invention advantageously provides SWIPT, which allows providing energy or power to a device at the same time as ongoing data transmissions meant to other devices, for instance, maintaining the data transmissions to other devices.

In other words, the present invention advantageously specifies which side information could be required, how it is conveyed and then used by both the device and the energy provider when SWIPT is used. More specifically, the present invention advantageously provides an information provision and a decision process that enables the adaptation and/or the optimization of the beam shape or beamforming design in order to simultaneously transfer energy and information, depending on the amount and type of information available at the transmitter.

In other words, the present invention advantageously can be applied to many different scenarios, as it consists of an information provision and utilization process, which can be performed in any wireless network.

The present invention advantageously provides the signaling and logical process that needs to be implemented in adaptive manner to make these solutions suitable for real system implementation for various and different scenarios, i.e., into a product.

In a first possible implementation form of the system according to the first aspect, the controller module is configured to request the feedback information from the device and/or another device. This provides the effect that feedback information is provided, for instance, for adapting energy harvesting and information decoding requirements. This advantageously provides to implement an adopted signal processing solution to efficiently construct the signal to be transmitted, providing simultaneous wireless information and energy transfer.

In a second possible implementation form of the system according to the first aspect as such or according to the first implementation form of the first aspect, the feedback information comprises:
 location-related information; and/or
 energy-related information; and/or
 quality-of-service, QoS,-related information; and/or
 channel state information, CSI.

This provides the effect that parameters of the device are incorporated into the calculation for allocating the device to the energy transfer resource. This advantageously provides an improved energy transmission based on parameters which are easily accessible.

Channel state information, CSI, can comprise a direction of a beam, an attenuation of the beam, and/or any parameter of channel of the data communication link. Channel state information can comprise any further channel property of the data communication link. Channel state information can describe how a signal and/or a wave used for energy transmission propagates from the transmitting device to the receiving device. Channel state information can describe scattering, fading, and/or power decay with distance.

In a third possible implementation form of the system according to the first aspect as such or according to the any of the preceding implementation forms of the first aspect, the controller is configured to receive the feedback information:
- essentially continuously; and/or
- discretely, in particular
  - i) periodically; and/or
  - ii) in an event-based manner, i.e., in an event-driven architecture. This provides the effect of periodic or even-driven information transfer. This advantageously provides an increased performance.

The term "discretely" as used by the present invention may refer to a discrete receiving of the feedback information as occurring at distinct, separate points in time. The receiving of the feedback information between any two separate points in time may be predefined.

The term "essentially continuously" as used by the present invention may refer to an essentially continuously or real-time receiving of the feedback information, for example operational deadlines from event to system response. The essentially continuously receiving of the feedback information may provide a response within specified time constraints.

In a fourth possible implementation form of the system according to the first aspect as such or according to the any of the preceding implementation forms of the first aspect, the controller is configured to receive feedback information as part of data signal that carries the feedback information and further data.

In other words, piggybacking may be used as a bi-directional data transmission technique in the network layer. Devices piggyback on the data requests their request for energy. This provides the effect of less power consumption for data transmission. This advantageously provides an improved performance of the system.

In a fifth possible implementation form of the system according to the first aspect as such or according to the any of the preceding implementation forms of the first aspect, the mapper is configured to allocate the device or another device to
- different frequency bands;
- different time slots;
- different symbols and/or subcarriers;
- different antennas; and/or
- different antenna beams.

This provides the effect that the allocation is calculated with high accuracy based on various network parameters. This advantageously provides an improved energy transmission based on network parameters which are easily accessible.

The term "symbol" as used by the present invention may be understood as to refer to a collection, in various sizes, of bits as also defined in Long Term Evolution/Orthogonal Frequency-Division Multiplexing, abbreviated LTE/OFDMA.

The term "sub-carrier" as used by the present invention may be understood as to indicate the orthogonal sub-bands.

In a sixth possible implementation form of the system according to the first aspect as such or according to the any of the preceding implementation forms of the first aspect, the system comprises a sender configured to generate a signal for the device and/or another device based on the feedback information. This provides the effect that the signal transmission is provided. This advantageously provides an adjusted and an improved performance of the network communication.

In a seventh possible implementation form of the system according to the sixth possible implementation form of the system according to the first aspect, the sender is configured to generate the signal to maximize an energy transmission, in particular an energy transmission and a data transmission, to the device and/or another device with respect to a QoS-constraint to be met for at least one further device. The energy transmission is maximized and at the same time it is provided that QoS-constraints are met and not affected by the maximising of the energy transmission. This provides the effect that the energy transmission is more efficient. This advantageously provides an improved performance of the energy transmission of the communication network.

In an eighth possible implementation form of the system according to the first aspect as such or according to any of the preceding implementation forms of the first aspect, the sender is configured to generate the signal to maximize a QoS-parameter of the device and/or another device with respect to a constraint relating to energy transmission of the device and/or another device. This provides the effect that constraints can be used for the energy transmission. This advantageously provides an improved performance of the energy transmission.

According to a second aspect, the present invention relates to a device, in particular a network device, for energy harvesting, wherein the device is configured to be coupled to a system according to the first aspect as such or according to any of the preceding implementation forms of the first aspect and to receive an energy transmission from this system.

According to a third aspect, the present invention relates to a method for controlling and/or receiving an energy transmission configured to operate a system according to the first aspect as such or according to any of the preceding implementation forms of the first aspect and/or a device according to the second aspect.

In a first possible implementation form of the method according to the third aspect, the method comprises the following steps:
- i) receiving feedback information on energy transmission and/or on data transmission from the device and/or another device by a controller; and
- ii) allocating the device to an energy transfer resource based on the feedback information by a mapper.

This provides the effect that feedback information is provided, for instance, for adapting energy harvesting and information decoding requirements. This advantageously provides to implement an adopted signal processing solution to construct the signal to be transmitted.

According to a fourth aspect, the present invention relates to computer program configured to operate a method according to the second aspect as such or according to any of the preceding implementation forms of the second aspect.

The methods, systems and devices described herein may be implemented as software in a Digital Signal Processor, DSP, in a micro-controller or in any other side-processor or as hardware circuit within an application specific integrated circuit, ASIC or in a field-programmable gate array which is an integrated circuit designed to be configured by a customer or a designer after manufacturing—hence "field-programmable".

The present invention can be implemented in digital electronic circuitry, or in computer hardware, firmware, software, or in combinations thereof, e.g. in available hardware of conventional mobile devices or in new hardware dedicated for processing the methods described herein.

These and other aspects of the present invention will become apparent from and be elucidated with reference to the embodiments described hereinafter. A more complete appreciation of the present invention and the attendant advantages thereof will be more clearly understood with reference to the following schematic drawings.

BRIEF DESCRIPTION OF THE DRAWINGS

Further embodiments of the invention will be described with respect to the following figures, in which.

DETAILED DESCRIPTION OF EMBODIMENTS OF THE INVENTION

In the associated figures, identical reference signs denote identical or at least equivalent elements, parts, units or steps. In addition, it should be noted that all of the accompanying drawings are not to scale.

The technical solutions in the embodiments of the present invention are described clearly and completely in the following with detailed reference to the accompanying drawings in the embodiments of the present invention.

According to an exemplary embodiment of the present invention, the system for controlling energy transmission advantageously provides that all the aspects are addressed regarding which side information is necessary for SWIPT, and how to gather or process it.

According to an exemplary embodiment of the present invention, the system for controlling energy transmission advantageously provides detailing and mastering the information provision process and the decision process to be implemented when SWIPT-enabled transceivers are designed. In particular, the present invention advantageously does not operate on a snapshot of the network to solve a specific problem, but rather controls the amount of signaling in the network on-the-fly, as well as the operations that need to be performed to serve the users.

According to an exemplary embodiment of the present invention, the system for controlling energy transmission advantageously provides that for different specific scenarios, defined by a set of assumptions, e.g. channel state information, CSI, between transmitter and receiver available at the former, fixed allocation of energy harvesting, EH, and information decoding, ID, devices, location-related information known at the transmitter, number of devices in the network, which can be performed in any wireless network.

According to an exemplary embodiment of the present invention, the system for controlling energy transmission advantageously provides that an optimization for different scenario is provided.

The present invention advantageously provides and addresses the signaling part in order to make SWIPT possible. According to an exemplary embodiment of the present invention, the system 100 comprises a controller 101 and a mapper 102, within each SWIPT-enabled transceiver, which: determines which information, when and how it is used in order to implement the adopted signal processing solution to construct the signal to be transmitted, while reducing the overhead of the signaling and increasing its flexibility as compared to what is assumed and/or considered. According to an exemplary embodiment of the present invention, the system, once the requests from the devices are received by the controller, decides the allocating of network device.

According to an exemplary embodiment of the present invention, the system is configured to optimally transfer energy to some devices and deliver information to others.

According to an exemplary embodiment of the present invention, the system is configured to calculate which information the users will have to provide, i.e., complete CSI and location-related information, only CSI, only location-related information, no information at all, depending on both physical constraints, for instance available time, bandwidth, antennas and further parameters.

According to an exemplary embodiment of the present invention, the system is configured to reply to the devices that request information are also allowed to request energy transfers, by piggybacking one bit to the signal used for information request. This may be more efficient than allowing devices to actively request only energy transfers, as in this way the energy spent to transmit the request is comparable (if not much higher) than the amount of harvested energy.

According to an exemplary embodiment of the present invention, the system is configured to control the analogue and digital signal processing, by mapping the devices to time slots, beam shapes and operating modes (EH or ID), according to the adopted policy (obtained as a result of either an optimization problem or some heuristics).

Figure 1:
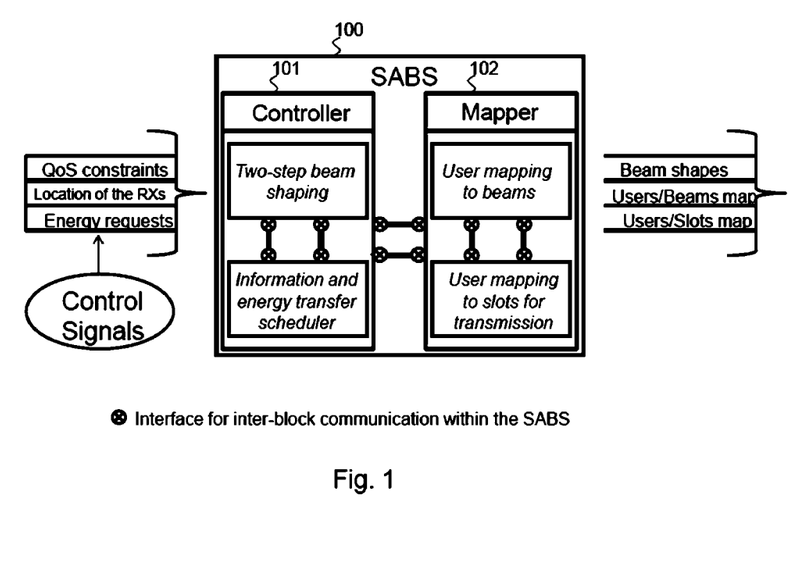
FIG. 1 shows a schematic diagram of a scheme of a SWIPT-aware adaptive beam shaper, abbreviated SABS, unit, including both controller and mapping, at the SWIPT-enabled transceivers according to one embodiment of the present invention.

FIG. 1 shows a schematic diagram of a scheme of a SWIPT-aware adaptive beam shaper, abbreviated SABS, unit, including both controller and mapping, at the SWIPT-enabled transceivers according to one embodiment of the present invention.

The system 100 in terms of the SABS comprises: a controller 101 and a mapper 102.

According to an exemplary embodiment of the present invention, consider a transmitter TX, serving a set of devices. Let u be the vector carrying the information symbols at the transmitter TX for the devices. Let $x = f(u)$ be the actual transmitted signal obtained by processing u according to the following.

According to an exemplary embodiment of the present invention, $f$ is a non-linear function, modeling a DSP of u.

According to an exemplary embodiment of the present invention, $f$ is a linear function, modeling an analog signal processing of u.

According to an exemplary embodiment of the present invention, $f$ is a non-linear function, modeling an analog signal processing of u.

According to an exemplary embodiment of the present invention, $f$ is a linear function, modeling a DSP of u. This exemplary embodiment will be taken as a reference scenario for ease of representation of the invention and its functioning.

According to an exemplary embodiment of the present invention, the two components of the SABS in terms of the system 100, responsible for the decisions taken by the system 100, are called a controller 101 and a mapper 102.

According to an exemplary embodiment of the present invention, the controller 101 is configured to decide which information to request to the devices in order to perform the signal processing. In particular, location related information is requested if the purpose of the transmission is purely an energy transfer to one or more devices.

According to an exemplary embodiment of the present invention, CSI and location related information is requested either if the purpose of the transmission is an information transfer or in order to perform a more efficient energy transfer.

According to an exemplary embodiment of the present invention, the mapper 102 is configured to allocate the devices or network device RX1, RX2, ..., RXn to the resources available at the transmitter TX based on the available side information for each device, and by applying either optimal control or heuristics.

According to an exemplary embodiment of the present invention, the devices or the network device RX1, RX2, ..., RXn are mapped to different frequency bands.

According to an exemplary embodiment of the present invention, the devices or the network device RX1, RX2, ..., RXn are mapped to different time slots.

According to an exemplary embodiment of the present invention, the devices or the network device RX1, RX2, ..., RXn are mapped to different beams.

According to an exemplary embodiment of the present invention, the devices or the network device RX1, RX2, ..., RXn are mapped to different antennas or set of antennas.

According to an exemplary embodiment of the present invention, the devices or the network device RX1, RX2, ..., RXn are mapped to one or more of the aforementioned resources in a multi-resource allocation scenario, according to the considered setting.

A schematic representation of the SABS, highlighting the functional components, is given in FIG. 1. Therein a possible implementation of the present embodiment is adopted for ease of representation, i.e., x is obtained as the result of a two-step linear precoding of u. Specifically, the two-step approach implies that x is obtained by multiplying u with a precoder obtained as the cascade of two 2-D digital filters, i.e., digital filters=$f(W_S, W_F)$, with matrix $W_F$ as the beamformer designed from the CSI, if available, alternatively reduced to the identity matrix; and/or matrix $W_S$ as the beam steerer designed from the information about the location of the receivers (RXs), if available, alternatively reduced to the identity matrix.

In this context, the overall precoder can easily be represented by a multiplication between its two components, i.e., matrix $P=W_S W_F$, and the overall transmitted signal is obtained as $$x = \frac{P}{\|P\|_F} u$$

where the denominator is the Frobenius norm of the matrix P.

The implementation of the SABS in FIG. 1 highlights the flexibility of the present invention, in terms of adaptive decisions and control. In particular, depending on the considered setting, the operations of the SABS are fully characterized by its approach to the information provisioning and the information processing:

According to an exemplary embodiment of the present invention, the information provisioning is addressed as follows: In each of its performed operations the SABS may make use of the information provided by the devices as input and outputs a resulting set of information meant to drive the operations of the transmitter TX:

According to an exemplary embodiment of the present invention, the input information is given by the QoS constraints of one or more devices.

According to an exemplary embodiment of the present invention, the input information is given by the energy requests of one or more network devices RX1, RX2, ..., RXn.

According to an exemplary embodiment of the present invention, the input information is given by the location-related information of one or more network devices RX1, RX2, ..., RXn.

According to an exemplary embodiment of the present invention, the input information is given by the CSI of one or more network devices RX1, RX2, ..., RXn.

According to an exemplary embodiment of the present invention, the input information is given by the combination of one or more of the previous embodiments. In particular, the resulting information provisioning is realized according to two methods: an open loop information provisioning and a closed loop information provisioning.

According to an exemplary embodiment of the present invention, the open loop information provisioning may involve periodic information transfer requests are performed by the devices. Further, there may be an energy/information provider can be fixed or mobile.

According to an exemplary embodiment of the present invention, the closed loop information provisioning may involve devices piggyback their energy transfer requests on the information transfer requests. Further, there may be an energy/information provider can be fixed or mobile.

The information processing may be further addressed as follows: After the operations performed by both controller 101 and mapper 102, and depending on adopted information provisioning method, the SABS outputs a set of information/signals.

According to an exemplary embodiment of the present invention, the information is given by the beam shapes that are adopted by the transmitter TX to serve the network devices RX1, RX2, ..., RXn.

According to an exemplary embodiment of the present invention, the information is given by the steering directions that are adopted by the transmitter TX to serve the network devices RX1, RX2, ..., RXn.

According to an exemplary embodiment of the present invention, the output information is given by the allocation function mapping devices to beams.

According to an exemplary embodiment of the present invention, the output information is given by the allocation function mapping devices to time slots.

According to an exemplary embodiment of the present invention, the output information is given by the allocation function mapping devices to frequency bands.

According to an exemplary embodiment of the present invention, the output information is given by the allocation function mapping devices to sub-sets of antennas.

According to an exemplary embodiment of the present invention, the output information is given by the combination of one or more of the previous embodiments.

Figure 2:
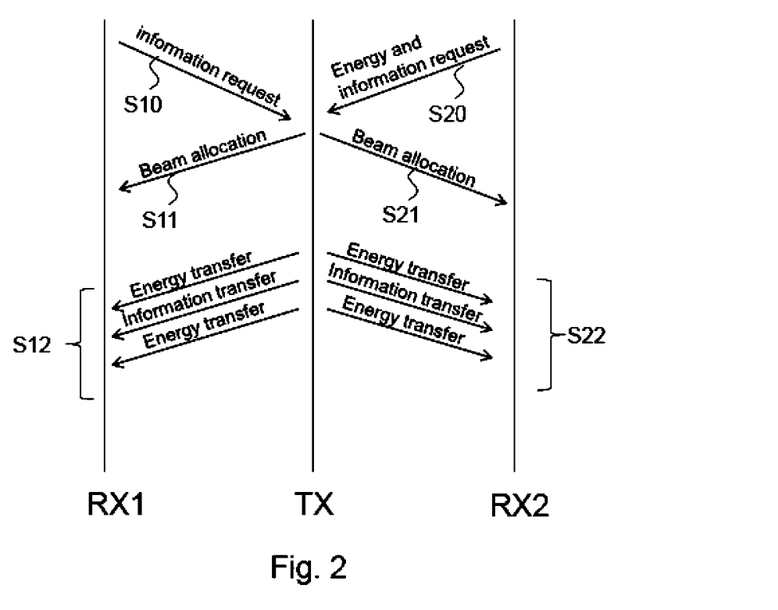
FIG. 2 shows a schematic diagram of sequence of operations performed by the SABS in case of open loop, on the left, and closed loop, on the right, information provisioning according to an embodiment of the present invention.

FIG. 2 shows a schematic diagram of sequence of operations performed by the SABS in case of open loop, on the left, and closed loop, on the right, information provisioning according to an embodiment of the present invention.

A graphic illustration of the operations performed by the SABS, when the two information provisioning methods are adopted is given in FIG. 2. In particular, the left and right portions of FIG. 2 may represent the sequence of operations performed by the SABS in case of open loop information provisioning (communication with network device RX1) and closed loop information provisioning (communication with network device RX2), respectively.

Initially, in step S10, an information request may be transmitted from the first network device RX1 to the transmitter TX.

Initially, in step S20, an energy and information request may be transmitted from the second network device RX2 to the transmitter TX.

In step S11, beam allocation may be performed by the transmitter TX with respect to the first network device RX1. The mapper 102 of the transmitter TX may be configured to allocate the first network device RX1 to different frequency bands, or different time slots, or different antennas and/or, different antenna beams.

In step S21, beam allocation may be performed by the transmitter TX with respect to the second network device RX2. The mapper 102 of the transmitter TX may be configured to allocate the second network device RX2 to different frequency bands, or different time slots, or different antennas and/or, different antenna beams.

In step S12, a sequence of different steps of energy and/or information transfers from the transmitter TX to the first network device RX1 may be performed.

In step S22, a sequence of different steps of energy and/or information transfers from the transmitter TX to the second network device RX2 may be performed.

Figure 3:
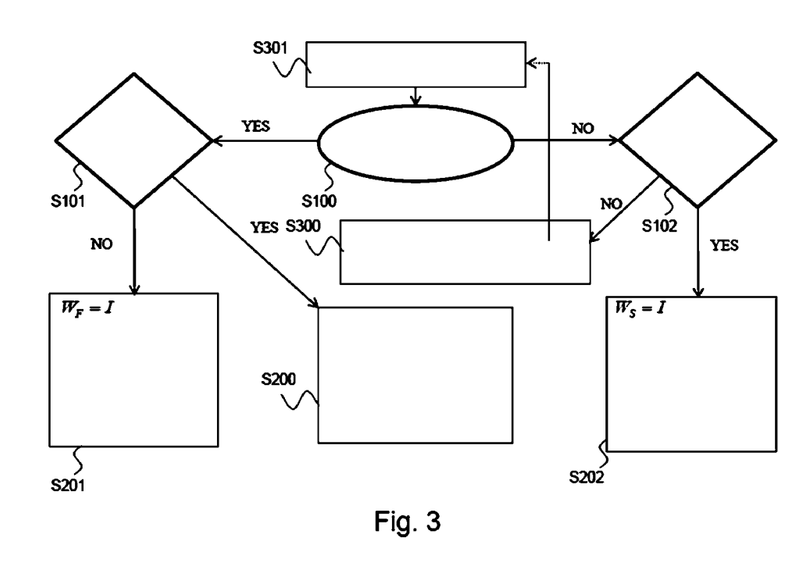
FIG. 3 shows a schematic diagram of an information processing of the SABS depending on the result of the information provisioning, for the considered implementation according to an embodiment of the present invention.

Similarly, a graphic illustration of the information processing of the SABS is given in FIG. 3, depending on the available information resulting from the information provisioning, for the considered implementation.

FIG. 3 shows a schematic diagram of an information processing of the SABS depending on the result of the information provisioning, for the considered implementation according to an embodiment of the present invention.

Initially, for controlling and/or receiving an energy transmission, an energy and/or information request is received from a device in step S301.

In step S100, it is considered whether the location info is available for devices requesting energy and/or information.

If considered no in step S100, in step S101, it is considered whether CSI is available for the links towards all devices.

If considered yes in step S100, in step S102, it is considered whether CSI is available for the links towards all devices.

If considered yes in step S101, in step S200, the precoder as designed by the SABS is obtained as the cascade of two 2-D non-trivial digital filters, i.e., a beamformer and a beam steerer, to serve the receivers requesting energy while guaranteeing QoS to the devices requesting information.

If considered no in step S101, in step S201, $W_F$ is equalized to I, i.e., the pre-coder designed by the SABS degenerates into the optimal beam steerer to transfer both information and energy to the devices.

If considered yes in step S102, in step S202, $W_S$ is equalized to I, i.e., the pre-coder designed by the SABS degenerates into the optimal beamformer to satisfy QoS constraints for information and transfer energy to the devices.

If considered no in step S102, in step S300, no change to P is performed in this slot. The SABS is the same as in the previous slot.

Subsequently, in step S301, an energy and/or information request may be received from a device.

Figure 4:
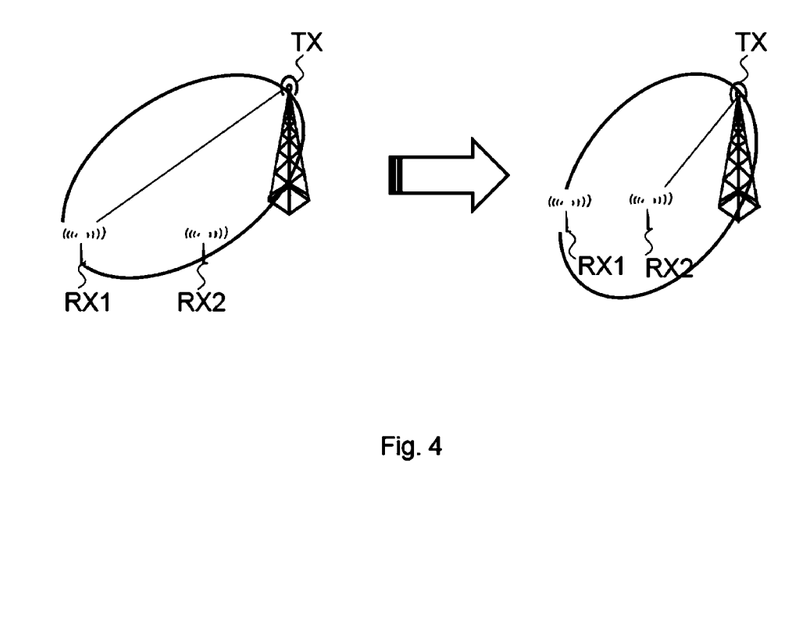
FIG. 4 shows a schematic diagram of the SABS steering the signal in the direction of the energy harvesting, EH, receiver, abbreviated RX, i.e., a second network device RX2, while fulfilling the QoS requirements of the information decoding, ID, receiver, i.e., a first network device RX1, the receiver which is intended for data transmission, according to an embodiment of the present invention.

FIG. 4 shows a schematic diagram of the SABS in form of a transmitter TX steering the signal in the direction of the energy harvesting, EH, receiver, i.e., the second network device RX2, while fulfilling the QoS requirements of the ID receiver, i.e., the first network device RX1 according to an embodiment of the present invention.

According to an exemplary embodiment of the present invention, an objective of the SABS is given by the considered implementation of how to steer the signal in the direction of the EH receiver, all the while guaranteeing the fulfillment of the QoS constraint of the ID RX, e.g. the signal to interference plus noise of the latter if above a given threshold. This operation is illustrated in FIG. 4, for convenience.

The efficiency of the information transfer directly depends on a given minimum threshold signal-to-interference-plus-noise ratio, SINR, above which information can be reliably decoded. Conversely, the efficiency of the energy transfer relies on the amount of power (from moderate to high) that is received at the EH network device receiver.

Figure 5:
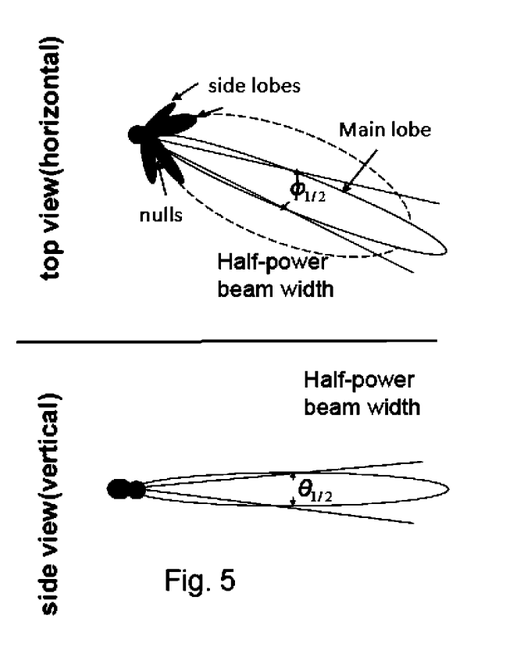
FIG. 5 shows a schematic diagram of a top and side view of the HPBW—The angular separation in which the magnitude of the radiation pattern decrease by 50%, or −3 dB, from the peak of the main beam according to one embodiment of the present invention.

FIG. 5 shows a schematic diagram of a top and side view of the HPBW—The angular separation in which the magnitude of the radiation pattern decrease by 50% (or −3 dB) from the peak of the main beam according to one embodiment of the present invention.

In wireless communication, the beamwidth affects both the directivity and the antenna gain, which in turn has an effect on the amount of received power at the receiver. In this context, the antenna gain can be expressed as G=ED, where E is the radiation efficiency and D is the antenna directivity. Now, let $\phi\frac{1}{2}$ and $\theta\frac{1}{2}$ be the half power beamwidth, HPBW, in one plane (radians) and in a plane at a right angle to the other (radians), respectively, i.e., the angular separation in which the magnitude of the radiation pattern decrease by 50% (or −3 dB) from the peak of the main beam, as depicted in FIG. 5.

Then, given that the antenna directivity can be computed as $$D = \frac{4\pi}{\Omega_A} \approx \frac{4\pi}{\theta_{1/2}\phi_{1/2}}$$

where $\Omega_A$ is the beam solid angle, doubling the beam solid angle halves the resulting antenna gain. As a matter of fact, a 3 dB SNR loss is experienced at the receiver in this case (for a lossless antenna and only path-loss attenuation).

According to an exemplary embodiment of the present invention, the flexibility provided by the system for controlling energy transmission allows the transmitter to consider these aspects as part of the control and decision process, and to optimize the network performance accordingly, in terms of both information and energy transfer.

Figure 6:
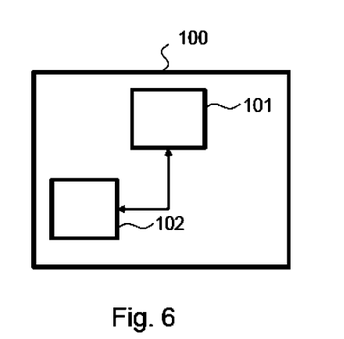
FIG. 6 shows a schematic diagram of a system for controlling energy transmission from a transmitter to at least one device, in particular network device according to one embodiment of the present invention.

FIG. 6 shows a schematic diagram of a system for controlling energy transmission from a transmitter to at least one device, in particular network device according to one embodiment of the present invention.

A system 100 for controlling energy transmission from a transmitter TX to at least one device, in particular network device, RX1, RX2, ..., RXn, is shown in FIG. 6. The system 100 comprises: a controller 101 and a mapper 102.

The controller 101 is configured to receive feedback information on energy transmission and/or on data transmission from the network device RX1 and/or another network device RX2, ..., RXn.

The mapper 102 is configured to allocate the network device RX1, RX2, ..., RXn to an energy transfer resource based on the feedback information.

Figure 7:
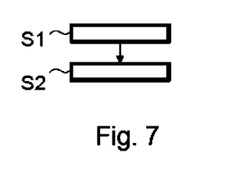
FIG. 7 shows a schematic diagram of a flowchart diagram of a method for controlling and/or receiving an energy transmission according to one embodiment of the present invention.

FIG. 7 shows a schematic diagram of a flowchart diagram of a method for controlling and/or receiving an energy transmission according to one embodiment of the present invention.

As a first step of the method, receiving S1 feedback information on energy transmission and/or on data transmission from the network device RX1 and/or another network device RX2, ..., RXn by a controller 101 may be performed.

As a second step of the method, allocating S2 the network device RX1, RX2, ..., RXn to an energy transfer resource based on the feedback information by a mapper 102 may be performed.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein.

While the present invention has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A system for controlling energy transmission from a transmitter to at least one network device, the system comprising:
a controller, configured to receive feedback information on energy transmission and/or on data transmission from the at least one network device, wherein the feedback information comprises channel state information;
a mapper, configured to allocate the at least one network device to an energy transfer resource based on the feedback information, wherein the allocation is further based on a beamformer designed from the channel state information; and
a sender, configured to generate a signal for the at least one network device based on the feedback information, wherein the sender is further configured to generate the signal to maximize an energy transmission and a data transmission to the at least one network device with respect to a quality of service (QoS) constraint to be met for at least one further device.

2. The system according to claim 1, wherein the controller is further configured to request the feedback information from the at least one network device.

3. The system according to claim 1, wherein the feedback information comprises:
location-related information;
energy-related information; and/or
quality-of-service (QoS)-related information.

4. The system according to claim 1, wherein the controller is further configured to receive the feedback information substantially continuously; and/or
discretely, in a periodic manner and/or in an event-based manner.

5. The system according to claim 1, wherein the controller is further configured to receive the feedback information as part of a data signal that carries the feedback information and further data.

6. The system according to claim 1, wherein the mapper is further configured to allocate the at least one network device to:
different frequency bands;
different time slots;
different symbols and/or subcarriers;
different antennas; and/or
different antenna beams.

7. A method, comprising:
receiving, by a system, feedback information on energy transmission and/or on data transmission from at least one network device, wherein the feedback information comprises channel state information;
allocating, by the system, the at least one network device to an energy transfer resource based on the feedback information, wherein the allocation is further based on a beamformer designed from the channel state information; and
generating, by the system, a signal for the at least one network device based on the feedback information to maximize an energy transmission and a data transmission to the at least one network device with respect to a quality of service (QoS) constraint to be met for at least one further device.

8. The method according to claim 7, wherein the method further comprises: requesting the feedback information from the at least one network device.

9. A non-transitory computer-readable medium having processor-executable instructions stored thereon for controlling energy transmission from a transmitter to at least one network device, wherein the processor-executable instructions, when executed, facilitate performance of the following:

receiving feedback information on energy transmission and/or on data transmission from the at least one network device, wherein the feedback information comprises channel state information;

allocating the at least one network device to an energy transfer resource based on the feedback information, wherein the allocation is further based on a beamformer designed from the channel state information; and generating a signal for the at least one network device based on the feedback information to maximize an energy transmission and a data transmission to the at least one network device with respect to a quality of service (QoS) constraint to be met for at least one further device.

10. The non-transitory computer-readable medium according to claim 9, wherein the processor-executable instructions, when executed, further facilitate:

requesting the feedback information from the at least one network device.

* * * * *